United States Patent [19]

Huberman et al.

[11] Patent Number: 4,835,732
[45] Date of Patent: May 30, 1989

[54] DETECTION OF MOTION IN THE PRESENCE OF NOISE

[75] Inventors: Bernardo A. Huberman, Palo Alto; William P. Keirstead, Stanford, both of Calif.; Stephanie Singer, New York, N.Y.

[73] Assignee: Xerox Corporation, Stamford, Conn.

[21] Appl. No.: 23,600

[22] Filed: Mar. 9, 1987

[51] Int. Cl.[4] ............................................. G06F 15/62
[52] U.S. Cl. ............................... 364/900; 364/931.02
[58] Field of Search ... 364/200 MS File, 900 MS File, 364/516, 517

[56] References Cited

U.S. PATENT DOCUMENTS

| | | | |
|---|---|---|---|
| 3,794,983 | 2/1974 | Sahin | 340/172.5 |
| 4,060,713 | 11/1977 | Golay | 364/416 |
| 4,468,727 | 8/1984 | Carrison et al. | 364/200 |
| 4,493,048 | 1/1985 | Kung et al. | 364/754 |
| 4,521,772 | 6/1985 | Lyon | 340/710 |
| 4,521,773 | 6/1985 | Lyon | 340/710 |
| 4,591,980 | 5/1986 | Huberman et al. | 364/200 |

OTHER PUBLICATIONS

W. P. Keirstead et al., "Collective Detection of Motion in the Presence of Noise", Physical Review Letters, vol. 56(10), pp. 1094–1097.
D. Marr, Vision, pp. 3–51 335–344, Freeman, San Francisco, 1982.
Dana H. Ballard et al., Computer Vision, pp. 1–15 and 195–225, Prentice-Hall, Inc., 1982.
T. Poggio et al., "Computational Vision and Regulation Theory", Nature, vol. 317, pp. 314–317, Sep. 26, 1985.
Gilad Adiv, "Inherent Ambigities in Recovering 3-D Motion and Structure from a Noisy Flow Field", IEEE Computer Society Conference on Computer Vision and Pattern Recognition, pp. 70–77, San Franscisco, CA, Jun. 19–23, 1985.
T. J. Broida et al., "Estimation of Object Motion Parameters from Noisy Images", IEEE Computer Society Conference on Computer Vision and Pattern Recognition, pp. 82–88, San Franscisco, CA, Jun. 19–23, 1985.
Richard F. Lyon, "The Optical Mouse, and an Architectural Methodology for Smart Digital Sensors", CMU Conference on VLSI Systems and Computations, pp. 1–19, Computer Science Press, Inc., 1981.
Carver Mead et al., "Introduction to VLSI Systems", pp. 5–10, Addison-Wesley Publishing Company, 1980.

*Primary Examiner*—Thomas M. Heckler
*Attorney, Agent, or Firm*—W. Douglas Carothers, Jr.

[57] ABSTRACT

A method and apparatus for a cellular processing array comprising a plurality of processing cells wherein each cell is capable of detecting intensity changes in a field under observation. The processing cells having one or more outputs connected as inputs to one or more neighboring processing cells and each of the connected inputs is indicative of whether or not its connected neighboring processing cell has detected an intensity change. Means are provided to increment the received inputs if the receiving cell has detected an intensity change from dark to light in consecutive detection cycles and to decrement the received inputs if the receiving cell has detected an intensity change from light to dark in consecutive detection cycles. The inputs as processed are provided as an output to connected neighboring processing cells. No incremental or decremental action on the inputs occurs if the receiving cell has detected light and/or if no intensity change has occurred in consecutive detection cycles, in which case, the inputs as received are provided as outputs to neighboring cells connected to receive output from the receiving output. The incremental or decremental action on received inputs may be a unit value or an amplification factor based upon past detection cycle activity.

8 Claims, 13 Drawing Sheets

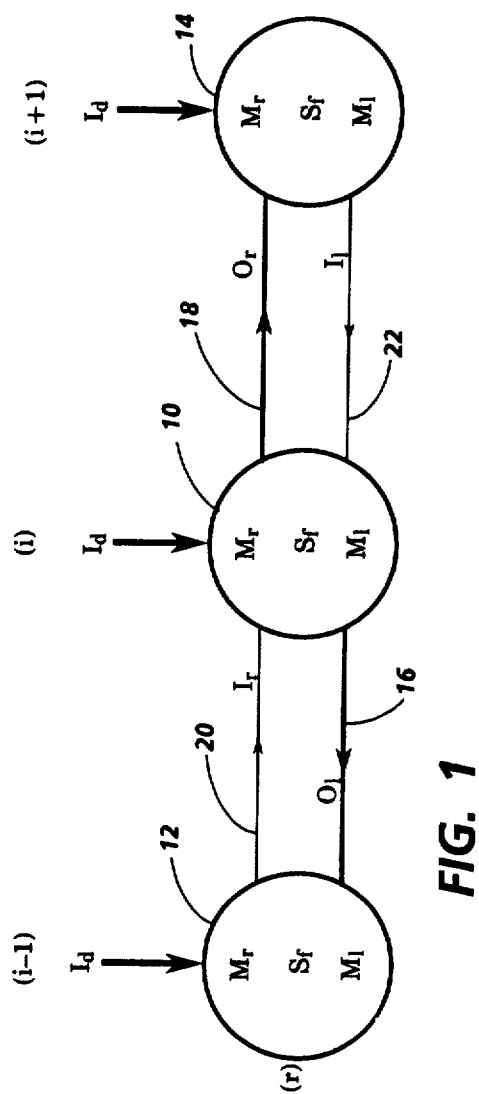
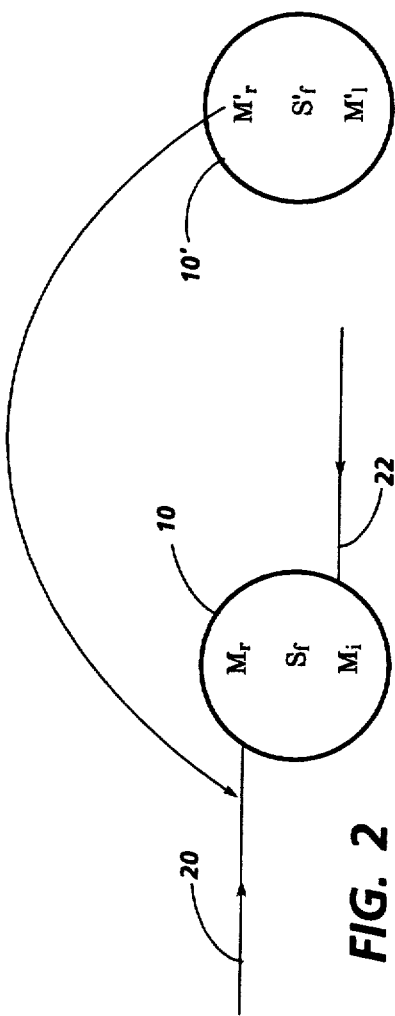
FIG. 1
FIG. 2

DETECTION OF MOTION IN THE PRESENCE OF NOISE

BACKGROUND OF THE INVENTION

This invention relates to motion detection and more particularly to the detection of movement, such as a contrasting body or interface, in the presence of a noisy background.

The detection of a moving interface is central to a number of problems in the physical and biological sciences. For an example, the growth of a new structure at a first order phase transition and the evolution of a pattern within a turbulent fluid pose serious challenges for their automatic detection. In vision, motion detection is the necessary first step for its interpretation. See, for example, D. Marr, Vision (Freeman, San Francisco, 1982); D. H. Ballard et al., Computer Vision (Prentice Hall, Englewood Cliffs, NJ, 1982) and T. Poggio et al., Nature 317, p. 314 et seq. (1985). The presence of noisy background leads to highly complex algorithms which are not always entirely successful or sufficiently robust. See G. Adiv, IEEE Computer Society Conference on Computer Vision and Pattern Recognition, p. 70 et seq. (IEEE Computer Society Press, Silver Springs, MD, 1985), and T. J. Broida and R. Chellappa, IEEE Computer Society Conference on Computer Vision and Pattern Recognition, p. 82 et seq. (IEEE Computer Society Press, Silver Springs, MD, 1985).

By exploiting the properties of computing arrays made up of locally connected simple cellular processors, one dimensional motion in noisy backgrounds can be accurately detected. It is more relevant, however, to detect two dimensional motion in a fluctuating environment vis a vis one dimensional motion. The extra dimension bring forth the important issue of accurately detecting motion at arbitrary angles in the plane of motion in the presence of noise while utilizing algorithms and architecture to perform the detection function which are basically complicated or complex. An example of the cellular approach to two dimensional detection is shown in R. F. Lyon, VLSI Systems and Computations, edited by H. T. Kung et al., pp. 1–19 (Computer Science Press, Silver Spring, MD, 1985), and U.S. Pat. Nos. 4,521,772 and 4,521,773. However, this scheme requires using uniform regular patterned backgrounds and does not take into consideration a random occurring noise pattern in the presence of the motion being detected. The possibility of noise problems are handled by using an inhibition technique which effectively eliminates any noise interference. The implementation of the technique, however, requires a considerable amount of logic and computation.

A principla object of this invention is to provide a one dimensional or two dimensional motion detection system comprising a plurality of interconnected cellular processing cells of simple architecture and operating under simple algorithm approaches to provide fault tolerant detection of motion in the presence of a random noisy background with reliable output even when some cells may have temporarily failed.

SUMMARY OF THE INVENTION

According to this invention, a novel computing structure implemented with current technology comprises a cellular processor array of locally connected detecting units or cells each having a photodetector that detect for a moving edge or spot in one or two dimensions reliably produce outputs in spite of failure of some of the array cells or the presence of noise in the form of random occurring spots present in the view field of the array during processing.

The method and apparatus of this invention comprises a cellular processing array having a plurality of processing cells wherein each cell is capable of detecting intensity change in a field under observation. The processing cells having one or more outputs connected as inputs to one or more neighboring processing cells and each of the connected inputs is indicative of whether or not its connected neighboring processing cell has detected an intensity change. Means are provide to increment the received inputs if the receiving cell has detected an intensity change from dark to light in consecutive detection cycles and to decrement the received inputs if the receiving cell has detected an intensity change from light to dark in consecutive detection cycles. The inputs as processed are provided as an output to connected neighboring processing cells. No incremental or decremental action on the inputs occurs if the receiving cell has detected light and/or if no intensity change has occurred in consecutive detection cycles, in which case, the inputs as received are provided as outputs to neighboring cells connected to receive output from the receiving output. The incremental or decremented action on received inputs may be a unit value or an amplification factor based upon past detection cycle activity.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 schematically illustrates three cells from cellular processor array according to this invention for one dimensional detection.

FIG. 2 schematically illustrates updating for a cell in the array.

DETAILED DESCRIPTION OF THE PREFERRED EMBODIMENTS

Figure 3:
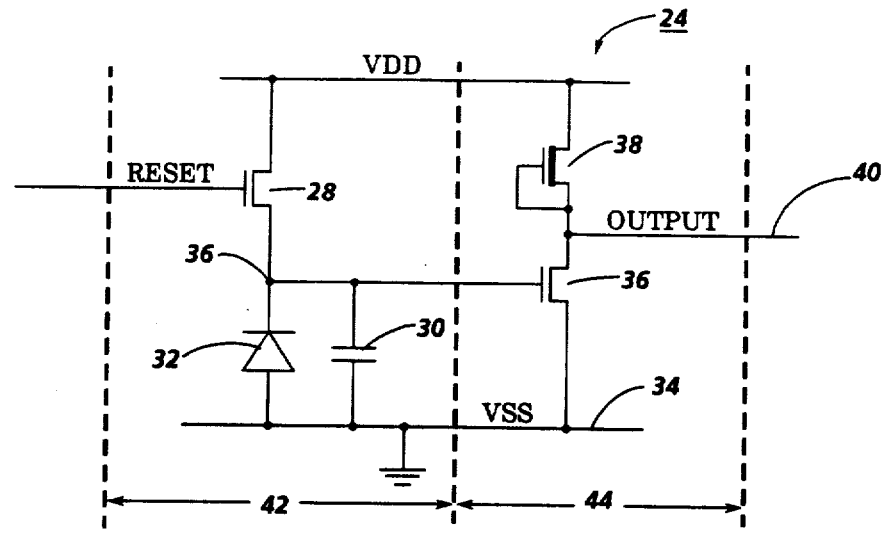
FIG. 3 is a circuit diagram of a light detector circuit for a cell in the cellular processor array.

Reference is now made to FIGS. 1 and 2 in consideration of a one dimensional array of identical processors for explaining the algorithms underlying this invention.

The present invention comprises a cellular processor array with a plurality of cells including a photodetector and with the cells connected in a one dimensional or two dimensional array in a manner to communicate with neighboring cells to indicate that a cell has or has not detected light during cyclic detection for motion, such as a moving spot of light in a contrasting field wherein the field has a high level of "noise". Such noise may also appear to the array as detected motion unless some means is provided to decipher or differentiate noise from actual motion. While this invention is described relative to light spot detection in a contrasting backgound by means of a plurality of interconnected photodectors forming light detector array with signal processing, it should be understood that the concept presented deals with detection of motion in a contrasting background containing spurious and random occurring noise. An example of an application would be detection of orbiting bodies or satellites in space against a background of stars and other illuminated bodies in out space. Further, the circuitry could be also designed to detect dark spots in constrasting or light background as is known to those skilled in the art as exemplified in U.S. Pat. No. 4,521,772.

Only a portion of a cellular processor array for one dimensional detection is shown in FIG. 1 and consists of a plurality of rows of identical processing cells each of which is locally connected to its neighbors in each row, r to transfer data values between the cells. In addition to data values received through these connections, each cell has an adjustable internal state which allows it to adapt to time dependent inputs. Inputs are taken from the top of the array and the outputs consist of internal states of the cells at given intervals of time. The inputs are binary, indicative of the absence or presence of light and the outputs are integer data values. Data values are constrained to lie in a specific interval between a minimum value, SIGMIN, and a maximum value, SIGMAX. The internal state of each cell is presented by $2v+1$ numbers, with $v$ being the maximal speed to be detected. Local computation algorithms provide a relaxation factor, S, which allows for accurate motion detection and transmission of revised or unrevised data values to connected neighboring cells.

For the purpose of understanding, the case of $y=1$ will be considered, i.e., motion in unit step intervals. FIGS. 1 and 2 illustrate the local computational considerations and cell connections. $M_r$ and $M_l$ represents locally contained data values held in memory which may be revised and transferred to adjacently connected cells respectively to the right $(i+1)$ or to the left $(i-1)$ of the cell, i, under consideration. Input, $I_d$, represents a binary value indicative of whether a photodectector in the cell has detected or not detected light. $S_f$ is a relaxation factor of binary value indicative of whether a cell under consideration has or has not detected light in a previous detection cycle.

For purposes of explanation, FIG. 1 only illustrates three cells in the array. Each cell in the array contains simple logic and memory similar to that illustrated in U.S. Pat. No. 4,591,980. However, the connection of the cells and the manner of operation is not the same as in the present invention. Unit or cell 10 under consideration is at the $i^{th}$ column of the array in a particular row, r, and is adjacent to row cells 12 and 14 on either side thereof. Cell 10 has outputs, $O_r$ and $O_l$, from its two memories, $M_r$ and $M_l$, connected as inputs to neighboring cells 12 and 14 via lines 16 and 18 and receives corresponding inputs, $I_r$ and $I_l$, from the two memories, $M_r$ from cell 12 and $M_l$ from cell 14, of neighboring cells 12 and 14 via lines 20 and 22.

Each cell in the array has a photodetector in the form of a photodiode to detect light in a field under observation and this input is represented by the input, $I_d$, to each cell.

Each cell has memory $M_4$ and memory $M_l$ for retaining a data value received from a corresponding memory, $M_r$ or $M_l$, of the cell to its right $(i+1)$ or left $(i-1)$, respectively. These data values are acted upon depending upon the observed input, $I_d$, and the value, $S_f$, representative of a relaxation factor which will be explained in detail later. The algorithms utilized are as follows. If $I_d=1$, $$\text{then } O_{r,l}(i) = M_{r,l}(i) + (1-S_f) \tag{1}$$

$$\text{else } O_{r,l}(i) = M_{r,l}(i) - 1. \tag{2}$$

In implementation, if the input, $I_d$, of cell 10 under consideration is high or "1", meaning that light has been detected in the field of view under observation, then the outputs, $O_{r,l}(i)$, to cell 12 to its left $(i-1)$ and to cell 14 to its right $(i+1)$ are equal to the accumulated data values of cell 10, $M_{r,l}(i)$ plus 1 minus $S_f$, the relaxation factor. Otherwise, if not light has been detected, the outputs, $O_{r,l}(i)$, are equal to the accumulated data values of cell 10 memories, $M_{r,l}(i)$, minus 1. This latter function is termed the decay factor. In simple terms, then, if a cell 10 under consideration has detected light, then the data value in memory plus 1 is sent to neighboring cells 12 and 14. If a cell 10 under consideration has not detected light, then the data value in memory minus 1 is sent to neighboring cells 12 and 14.

The value, $S_f$, is a relaxation factor incorporated to prevent run away conditions to be invoked in cases where motion is static, that is, in cases where no movement occurs, i.e., where a detected light spot remains stationary over a photodetector of a cell over two or more detection cycles. Thus, if cell 10 under consideration detected light in an immediately previous detection cycle, then the value for $S_f$ is equal to 1 and its data values in memories, $M_{r,l}(i)$, may be incremented by 1 according to the above equation (1). If the cell 10 in the next detection cycle detects light again, the data values in memories, $M_{r,l}(i)$, will remain unchanged according to the above equation (1). In the case where cell 10 has not detected light in an immediately previous detection cycle, then the value for $S_f$ is equal to 0. If cell 10 in the next detection cycle detects no light, its data values in memories, $M_{r,l}(i)$, may be decremented by 1 according to the above equation (2). If, then, cell 10 in the next detection cycle detects light, a value 1 will be added to the data values in the cell memories, $M_{r,l}(i)$ according to the above equation (1). If cell 10 continues to detect light in sequential detection cycles, the data values sent from $M_{r,l}(i)$ to neighboring cells will remain unchanged according to equation (1) so that data values from cells 12 and 14 are merely being transferred through cell 10 as if cell 10 were transparent.

In summary, then if, during a detection cycle, a cell has detected light, then its data values will be increased by one and are sent to its connected neighboring cells unless this same cell has detected light during the previous detection cycle, in which case the data values sent are unchanged. If, during a detection cycle, a cell has not detected light, then its data values will be decreased by one and are sent to its connected neighboring cells. In essence, coherence is being built upon by broadcasting a hypothesis that motion has been detected. Otherwise, anything else observed in one detection cycle or over a few detection cycles which subsequently vanishes without further appearance is attenuated.

Thus, equation (1) amounts to sending to the right $(i+1)$ and left $(i-1)$ cells the data values of the corresponding memories increased by $1-S_f$. Since $S_f$ is set equal to 1, if at the previous time step, input, $I_d$, was also 1, and to 0 otherwise, this procedure prevents a given cell from increasing its outputs in two successive time steps. Furthermore, equation (2) shows that zero $I_d$ input at any given time makes the output relax by 1 for the next time step.

FIG. 2 relates to the updating process during a succeeding detection cycle. If $S_f = I_i$, where $S'_f$ is the relaxation factor on the next succeeding detection cycle, then $M'_l = O_l(i+1)$ and $$M'_r = O_r(i-1). \quad (3)$$

Thus, during the next detection cycle, i.e. $S'_f = I_i = 1$, then the new data values, $M'_l$ and $M'_r$ for cell 10 will be, respectively, the outputs $O_l$ and $O_r$ representing the data values from memories Mr and M$_l$ respectively from cell 14 to the right $(i+1)$ and from cell 12 to the left $(i-1)$.

To use the array as a motion detector, one need only determine which data values are greater then a predetermined threshold. This, in turn, indicates which cells have detected motion corresponding to the time requirement of the cell processing or the length of the detection cycle. In our work, we samples outputs after a fixed number of time steps or detection cycles and employed a threshold value of 3 with SIGMAX equal to 10 and with SIGMIN equal to 0.

FIG. 3 discloses the photodetector and detection circuitry 24 for each cell 10. Circuitry 24 comprises a light detector 42 and inverter circuitry 44. Light detector 42 comprises dynamic node 26 which is isolated by low impedance transistor 28 and normally is capable of holding its voltage level for long periods of time due to its capacitance 30 to the ground 34. The photodiode 32 is representative of the light detection properties and is shown connected between node 26 and ground 34. When RESET at the base of transistor 28 is high or "1", transistor 28 is on and VDD charges dynamic node 26. When RESET is lower or "0", then transistor 28 is off and the charged node 26 is isolated from VDD. Light is detected by cell 10 due to the sensitivity of photodiode 32 causing it to collect negative charge. As a result, there is a decrease of voltage at node 26. The voltage at node 26 continues to decrease as diode 32 continues to be responsive to the presence of light.

The declining voltage at node 26 is monitored by inverter circuitry 44 represented by transistors 36 and 38 to sense the voltage of node 36 and communicate it as an output on line 40. The operation of this inverter circuit is conventional and disclosed in the book, "Introduction to VLSI Systems" by Carver Mead and Lynn Conway and published by Addison-Wesley Publishing Company, Chapter 1, pages 5-10. The inverter provides the compliment so that upon each RESET and charging of dynamic node 36, the voltage output 50 will start low then rise to a higher voltage as node 36 goes low due to detection of light and depletion of positive charge across the diode 32.

Figure 4:
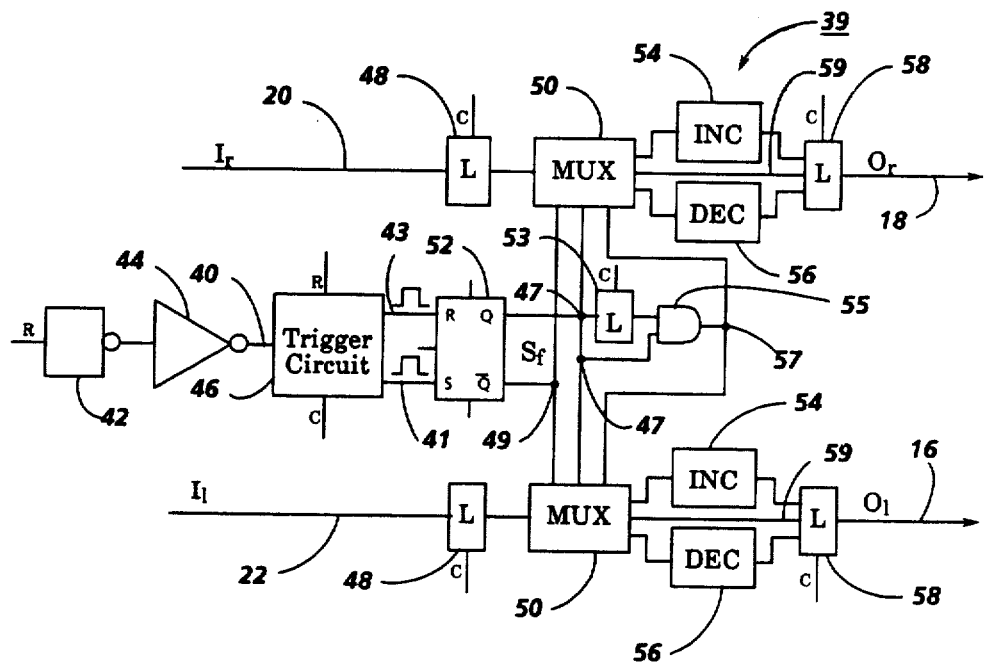
FIG. 4 is a schematic diagram of a circuit for a cell in the cellular processor array of the type represented in FIG. 1.

FIG. 4 is a schematic diagram of a cell circuit 39. Light detector 42 is connected to inverter 44, as previously explained, and its output 40 is connected as an input to trigger circuit 46. If the input 40 to trigger circuit 46 is high, circuit 46, under appropriate clocking, will produce a pulse output on line 41 and no output will occur on line 43. On the other hand, if the input 40 to trigger circuit 46 remains low, circuit 46, under appropriate clocking, will produce a pulse output on line 43 and no output will occur on line 41. Trigger circuit 46 is reset at the same time as light detector 42 at the beginning of each detection cycle. Trigger circuit 46 is clocked at a time in the detection cycle when detector 42 had had a sufficient opportunity to detect any light in its field of view. Line 41 from circuit 46 is connected to the S input of R-S flip-flop 52. Line 43 from circuit 46 is connected to the R input of R-S flip-flop 52.

The Q output of flip-flop 52 is connected by line 47 to an input of each of the two MUXs 50 and the $\overline{Q}$ output of flip-flop 52 is connected by line 49 to another input of each of the two MUXs 50. Line 47 is also connected to latch 53 which has its output connected to one of the inputs to AND gate 55. The other input of AND gate 55 is connected to line 47. The output of AND gate 55 is connected via line 57 to a third input of the two MUXs 50.

The combination of input latches 48, MUX 50, incrementor 54, decrementor 56 and output latch 58 represents memories Mr and M$_l$, input/output latches 48 and 58 functioning as memories for data values before and after these values have been acted upon via operation of MUX 50.

The inputs, $I_r$ and $I_l$, from connected neighboring cells 10 respectively on lines 20 and 22 are received by latches 48. Upon clocking, the output from latches 48 is presented to MUXs 50 which, depending upon the input relative lines 47, 49 and 57 from flip-flop 52, will be selectively place as an input to either incrementors 54 or decremetors 56 or latches 58. The outputs, $O_r$ and $O_l$, from latches 58 are provided as inputs to connected neighboring cells 10 respectively on lines 18 and 16.

In operation, if detector 42 of a cell 10 has detected light, the input to trigger circuit 46 from inverter 44 will be high. Upon clocking, circuit 46 will provide an output on line 41 to flip-flop 52 which will set Q to "1" and $\bar{Q}$ to "0". This provides a high or "1" output on line 47 indicative of the value, S, equal to 1, meaning that the cell has detected light. The input on line 47 to MUXs 50 will cause the output from latches 48 to be presented as an input to incrementors 54. Incrementors 54 increase the value received from latches 48 by one if the value received is not a predetermined maximum value equal to SIGMAX set in incrementors 54. If the value is equal to SIGMAX, the value will not be incremented and will placed, as is, on the input to latches 58. If the value is less than SIGMAX, the value will be incremented by one and placed on the input to latches 58. By the same token, if detector 42 of a cell 10 does not detect light, the input on line 40 to trigger circuit 46 will have remained low. Upon clocking, circuit 46 will provide an output on line 43 to flip-flop 52 which will set Q to "0" and $\bar{Q}$ to "1". This provides a high or "1" output on line 49 indicative of the value, S, equal to 0, meaning that the cell has not detected light. The input on line 49 to MUXs 50 will cause the output from latches 48 to be presented as an input to decrementors 56. Decrementors 56 decrease the value received from latches 48 by one if the value received is not a predetermined minimum value equal to SIGMIN set in decrementors 56. If the value is equal to SIGMIN, the value will not be decremented and will be placed, as is on line 59, on the input to latches 58. If the value is greater than SIGMIN, the value will be decremented by one and placed on the input to latches 58.

If detector 42 detects light again during the next detection cycle, upon clocking, circuit 46 will provide an output on line 41 to flip-flop 52 which will leave the Q output of flip-flop 52 set to "1". Line 47 will be high or "1". However, line 57 will also be high or "1" because the inputs to AND gate 55 will be both high or "1" since the input to AND gate 55 from latch 53 will be high or "1" from the previous detection cycle and the other input to AND gate 55 is also high or "1" in the instant detection cycle. Two high or "1" inputs on lines 47 and 57 to MUXs 50 will cause the output from latches 48 to be presented as an input directly to latches 58, as no change is made to the values received from the inputs from neighboring cells.

Clocking of circuit 39 is such that at t=0 in a detection cycle, the inputs R, to detector and trigger circuits 42 and 46 are reset. Also, latches 48, 53 and 58 are clocked so that their inputs are placed on their outputs. During the detection cycle when t=ready (i.e. sufficient time has passed for detection of light by detectors 42), trigger circuit 46 is clocked so that the appropriate selection is made at MUXs 50 for transfer of the value at latches 48 through the selected circuitry and then presented as the input to latches 58. At t=0 (or the end of the detection cycle), latches 48, 53 and 58 are clocked so that their inputs are placed on their outputs and the inputs, R, to detector and trigger circuits 42 and 46 are reset.

Figure 5:
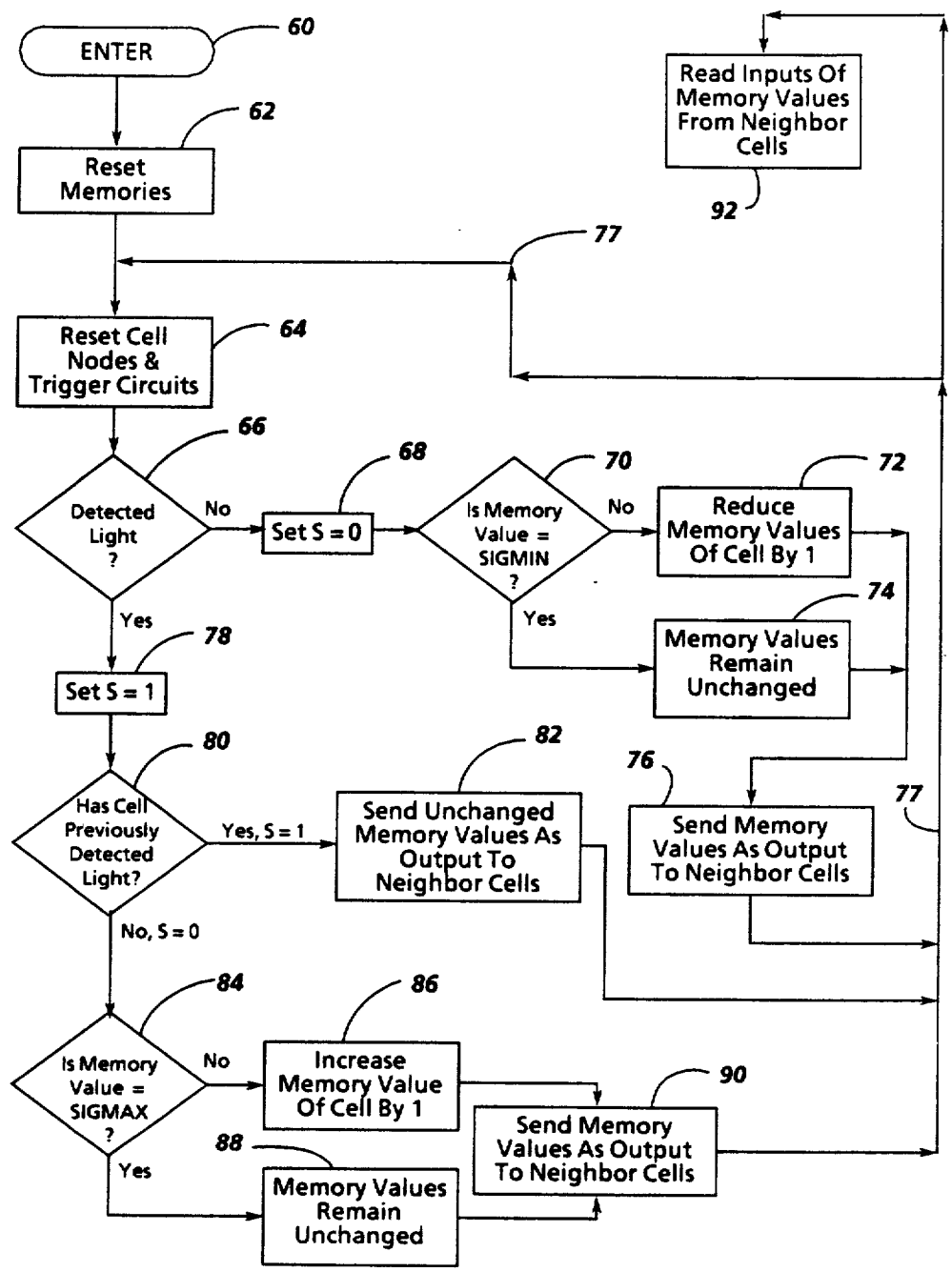
FIG. 5 is a flowchart illustrating the algorithms used in the cellular processor array according to this invention.

The above algorithms are now explained relative to the flowchart of FIG. 5. At the point of entry 60, the memories, $M_r$ and $M_l$, of cells 10 in the array are cleared as indicated at box 62. This means that latches 48, 53 and 58 are reset. Next, the nodes 36 of cells 10 are reset so that they are charged to their higher value. At the same trigger circuit 46 is reset. The detection cycle commences with the detection taking place relative to the field of view for the array. The decision as to detected light is indicated at 66. If no light is detected, then the value for the relaxation factor, S, is set to 0 as indicated at box 68. Decision 70 indicates whether the value in memories, $M_r$ or $M_l$, are at their saturation point or equal to SIGMIN. If not, the values are reduce by one, as indicated at box 72. If so, the values remain unchanged as indicated at box 74. The resulting value, whether changed or not, is then sent to connected neighboring cells on output lines 16 and 18, as indicated at box 76. This is accomplished by latches 58. At this point, the cells that have not detected light are ready for the next detection cycle and reset, as indicated by return line 77 in FIG. 3.

If light has been detected at decision 66, then the value for the relaxation factor, S, is set to 1 as indicated at box 78. At this point a further decision 80 is required to determine if the cell under consideration has detected light in the immediately previous detection cycle. If yes, then, the memory value, received as inputs from connected neighboring cells on input lines 20 and 22, are sent to connected neighboring cells on output lines 16 and 18, as indicated at box 82. At this point, the cells that have detected light again are ready for the next detection cycle and reset as indicated by return line 77 in FIG. 3. It should be noted that as long as a cell has previously detected light, the memory values will remain unchanged and such a cell in these circumstances functions as a conduit for the memory values of the cells on either side of it If the cell under consideration has not detected light in the immediately previous detection cycle, then a change in memory values received may occur. Decision 84 indicates whether the value in memories, $M_r$ or $M_l$, are at their saturation point or equal to SIGMAX. If not, the values are increased by one, as indicated at box 86. If so, the values remain unchanged as indicated at box 88. The resulting value, whether changed or not, is then sent to connected neighboring cells on output line 16 and 18, as indicated at box 90. This is accomplished by latches 58. At this point, the cells that have detected light are ready for the next detection cycle and reset, as indicated by return line 77 in FIG. 3.

Return line 77 also leads to box 92 indicated the new memory values are read from connected neighboring cells. This is accomplished by latches 48.

Figure 6A:
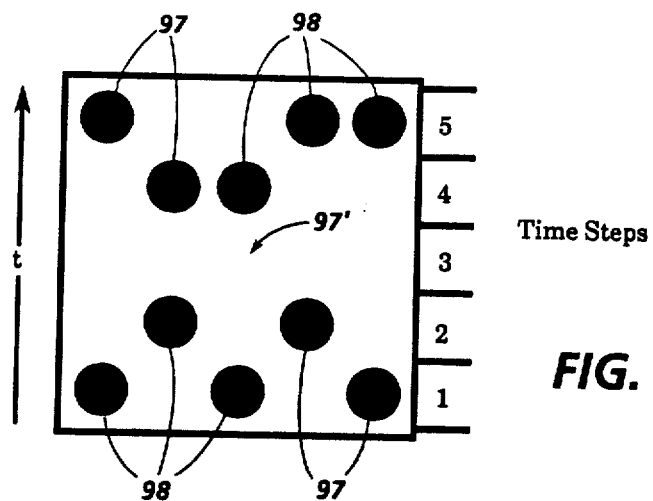
FIG. 6A is a representation over time in the detection of a spot represented by a dark dot moving in five detection cycles in the presence of a fluctuating background represented by a multitude of randomly located dark dots.

In order to analyze the dynamical behavior of the parallel cellular array described above, several experiments were conducted. These experiments consisted of sending to the array time sequences of input strings representing moving spots in noisy backgrounds. This was achieved by selecting a particular pattern with a spot moving with uniform speed to either the right or left in the presence of randomly generated background in the form of randomly appearing and disappearing spots. These experiments were conducted on arrays consisting of ten, twenty and thirty cells with the exposure length of the cell detectors set up to be the same magnitude as the corresponding array length. The field of view or observation 96 moving in front of the array is shown in FIG. 6A. Time is represented along the vertical illustrating five time steps or detection cycles and the breath of the field being observed is indicated along the horizontal. The spot 97 under observation has moved five time steps from the buttom right corner of the figure to the upper left corner of the figure, disappearing from view at 97' during the third time step. The array will monitoring its progress by passing along to connected neighboring cells a data value indicative of its citing. The other spots 98 in the field are random occurring noise in the form of detected spots that occur during one or more time steps or detection cycles and then are gone. Their represented data values in the array will quickly decay.

Figure 6B:
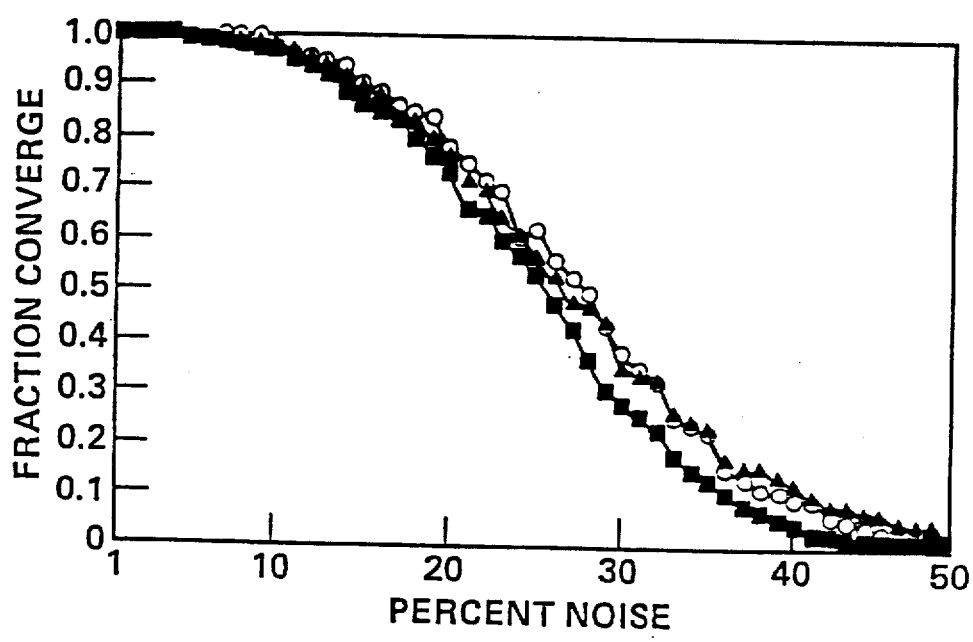
FIG. 6B is a graphic illustration of the fraction of correct outputs in spot detection as a function of percent noise.

FIG. 6B illustrates the fraction of correct outputs detecting a spot of light moving from left to right in ten time steps (circles), in twenty time steps (sold Triangles) and thirty time steps (squares) as a function of total time-space noise, i.e., the fraction of outputs which converged to the corrected one as a function of noise in the total input sequence or time-space volume. As is evident from FIG. 6B, the basin of attraction for given input sequences mapping to the correct output is quite large since, for noise levels of up to 25% of the total time-space volume, more than half of the outputs are still desired ones indicated actual spot movement. Up to 10% noise, 100% correct detection of spot movement is observed. With 20% noise, correct detection of spot movement is observed. This is a relatively slow decrease in spot movement detection accuracy for the amount of increase of percent noise. It is also evident that this data is independent of array size.

Figure 7:
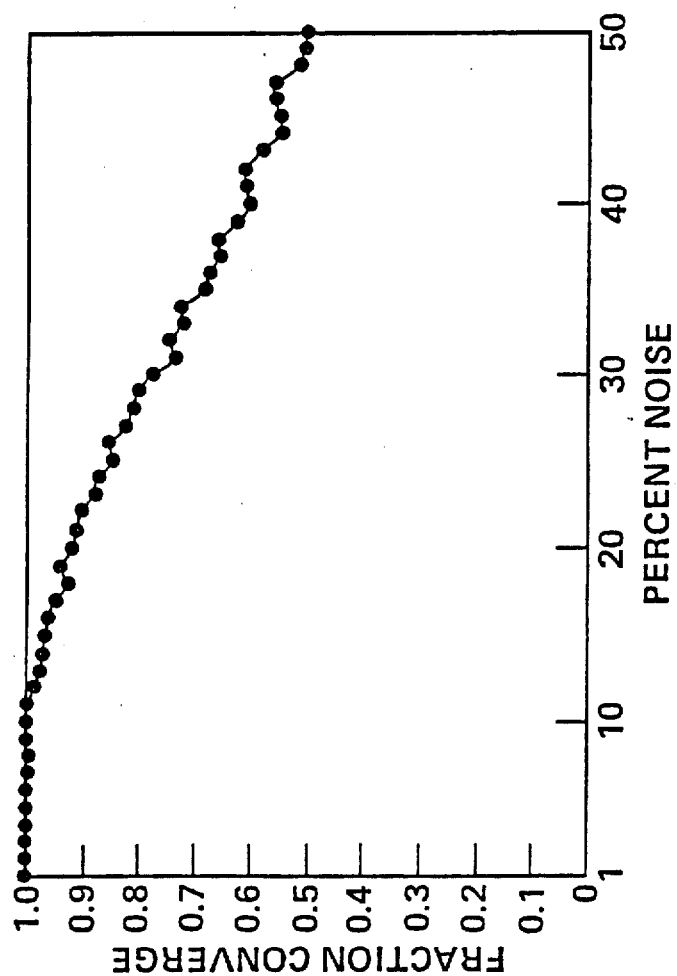
FIG. 7 is a graphic illustration of the percentage of null outputs in the presence of random inputs as a function of percent noise.

Other experiments were conducted relative to the responses of these arrays to purely random input patterns, i.e., to determine whether in the presence of a purely random noise background, the array architecture would spuriously detect nonexistent motion. In order to test this possibility, random in put sequences were fed to a ten cell array and the responses to detected light activity were monitored at given time intervals. FIG. 7 depicts the result of this experiment indicating the fraction of the time that a moving spot was validly detected within a random noisy background. FIG. 7 illustrates that up to 25% noise, one can maintain a better than 50% chance of achieving a valid output. The results are strongly dependent also on the refractoriness of the cells, i.e., their inability to increase their outputs in two successive steps if the value of $S_f$ is 1. This can be seen by setting $S_f$ equal to 0 in all cells for all times and observing the consequential degradation in the performance of the array.

On aspect of this invention is that in the case of one dimensional processing the technique of programming the cells in the array to follow a rule of attraction or rule of dissociation may be utilized to move the value of a cell toward one of two states, a state of dissimilarity or a state of similarity, as taught in U.S. patent application Ser. No. 711,930, filed Mar. 15, 1985 and is incorporated herein by reference thereto. Utilizing this process of computation with attractors as taught in this patent application in combination with the relaxation factor of this patent application produces a strong form of fault tolerances so that if some of the cells 10 in the array are not functioning properly or not functioning at all, the cellular array can still function to detect motion in a noisy background environment.

Figure 8:
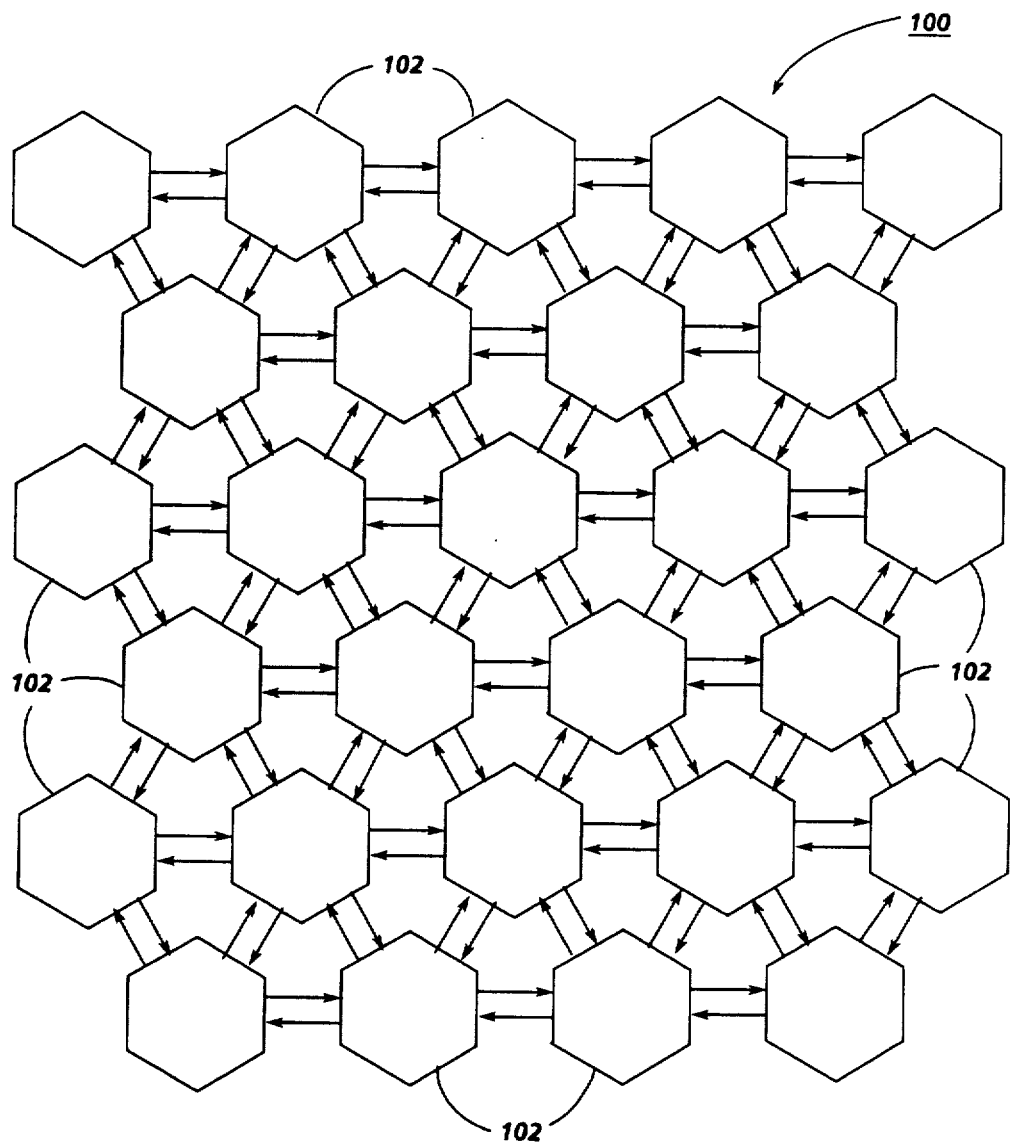
FIG. 8 schematically illustrates a cellular processor array according to this invention for two dimensional detection.

The forgoing relates to a cellular processor array wherein detection is only possible in opposite directions in one dimension. The algorithms utilized in this invention may also be employed in a cellular processor array that can detect motion in opposite directions in two dimensions. An example of such an array is shown in FIG. 8. Cellular processor array 100 comprise a plurality of senary sided input/output cells 102. Cells 102 also have one additional input from its light detector 42. Each of the six outputs of each cell 102 is connected to a neighboring cell 102 as one of its six inputs, except, of course, for edgee cells in the array. While senary side input cells are shown as an example, it should be noted that this invention is also applicable to a four sided or other multi-input cell configurations.

Figure 9:
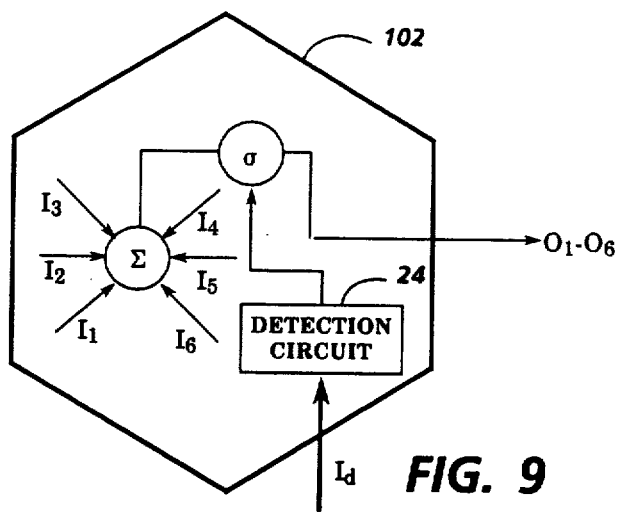
FIG. 9 is a schematic representation of a coupling arrangement that may be employed for the hexagonal detecting units or cells in a cellular processor array according to this invention.

The cells 102 in array 102 are designed like cells 10 except there are four additional inputs and four additional outputs for input/output connection to four diagonally positioned neighboring cells relative to the cell under consideration. Each cell 102 detects the presence or absence of light in the same manner as previously explained relative to FIG. 3. At time t=ready, if light has been detected, then the output on line 40 is high; otherwise it is low indicating the absence of light. The inputs and outputs are represented by integer values and the outputs, O, are representative of the strength of the inputs and the value of I. In no case is the value allowed to rise above SIGMAX or fall below SIGMIN. With reference to FIG. 9, each output, $O_1$–$O_6$, is the product of a weighted average, $\Sigma$, of the inputs, $I_1$–$I_6$, and an internal amplification factor, $\sigma$, which is determined by the value of Id and the amplification factor, $\sigma$, both from the previous detection cycle. The amplification factor changes in time and varies from cell to cell, but all six outputs, $O_1$–$O_6$, are computed using the same amplification factor, $\sigma$. When the strength of an output, O, reaches SIGMAX, motion has been detected.

In general, what is occurring is the building upon coherence in that as motion of a spot, for example, is detected in a path from cell to cell, the continued increase in the amplification level is an expectation that the spot has been detected and is being tracked. If the spot vanishes in a subsequent detection cycle, that expectation is reduced or attenuated. If the spot vanishes over several detection cycles, the expectation is continually attenuated until SIGMIN is reached and no further expectation is considered real.

When dealing with several inputs, SIGMAX can be reached rather quickly. Thus, it is preferred that the values for the inputs, I, be weighted and then averaged to to provide a single result representative of value strength. In the case of cell 102 in FIG. 9, the weighting of each input $I_1$–$I_6$ would be one sixth of each input. Alternatively, there is no reason, however, why the weighting factor applied to one or more or all of the inputs, I, may be different to meet the particular needs of a motion detection application.

Figure 10:
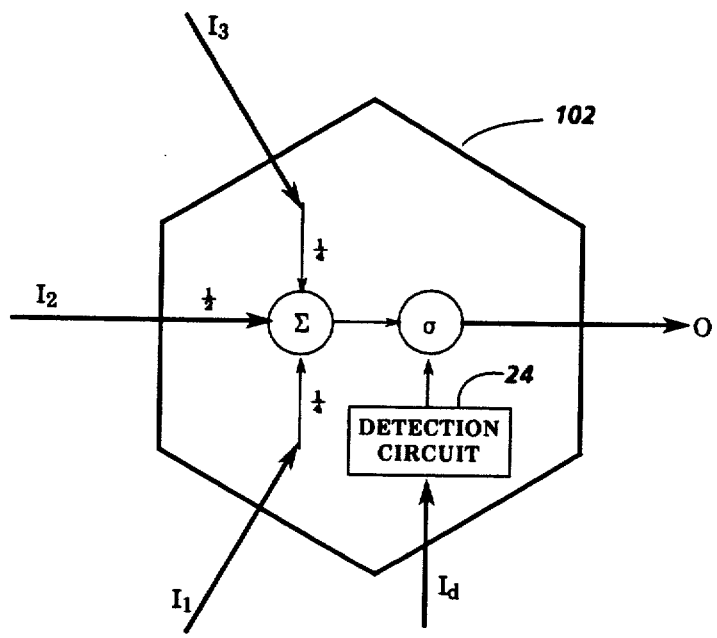
FIG. 10 is another schematic representation of a coupling arrangement that may be employed for the hexagonal detecting units or cells in a cellular processor array according to this invention.

Not all inputs, $I_1$–$I_6$, need by utilized or considered. For example, as shown in FIG. 10, on three inputs, $I_1$–$I_3$, are taken for weighted average. Thus, a cone-shaped zone input is weighted averaged and appropriately amplified and provided as an output, O. The weighting is shown as $I_1$ weighted at $\frac{1}{4}$ value, $I_2$ weighted as $\frac{1}{2}$ value and $I_3$ weighted at $\frac{1}{4}$ value. The average of these weighted values is multiplied by the amplification factor, $\sigma$, and sent out as output, O, to one or more connected neighboring cells. Thus, If $I_d$ changes from "0" to "1" or from "1" to "0" relative to an immediately past detection cycle, $$\text{then } O_y = (I_1 \times 1/n_1 + I_2 \times 1/n_2 + \ldots I_x \times 1/n_x) \times \sigma$$
$$\text{or } (\Sigma \lambda_i \times I_i) \times \sigma \qquad (4)$$

else $O_y=(I_1\times 1/n_1+I_2\times 1/n_2+\ldots I_x\times 1/n_x)\times \sigma$ or
$(\sigma\lambda_i\times I_i)\times \sigma$,   (5)

where $\lambda_i$ are positive weighting factors, $\Sigma\lambda_i>0$ and $\sigma$ is the amplification factor and is effectivrely increased or decreased depending upon a charge in intensity respectively from dark to light ("0" to "1") or light to dark ("1" to "0") between consecutive detection cycles. The factor, $\sigma$, may be binary, i.e., either "0" or "1", in which case the equations (4) and (5) function much the same as as equations (1) and (2).

The simplest case of weighted averages is to ignore five of the inputs, such as $I_1$ and $I_3$-$I_6$, and pass on $I_2$ according to the following rule:

$$I_2\times \sigma=O_5 \qquad (6)$$

Initially, the amplification factor in each cell 102 is set to a minimum integer value termed, AMPMIN. If a change in light intensity is detected between a previous detection cycle and an instant detection cycle, i.e. $I_{d(present)}=1$ and $I_{d(past)}=0$ or $I_{d(present)}=0$ and $I_{d(past)}=1$, then the amplification factor, $\sigma$, is set to a higher value or a maximum value, AMPMAX. As an example, AMPMAX may be 1 or greater than 1. If, on the other hand, there is no change in light intensity between a previous detection cycle and an instant detection cycle, i.e. $I_{d(present)}=I_{d(past)}=1$ or 0, then the amplification factor, $\sigma$, is set to a lower value or a minimum value, AMPMIN. As an example, AMPIN may be less than 1 or zero. If the values of AMPMAX and AMPMIN are respectively 1 and 0, then their functional characteristic is the same as $S_f$ in the previous embodiment. Of course, the values for AMPMIN or AMPMAX can be values other than binary so that multilevel amplification factor may be employed to provide for a higher resolve of motion detection.

This means, then, that until a particular cell 102 detects a change from light to dark or from dark to light, the cell will attenuate all input values. The more recently a cell 102 has detected an intensity change, the more it amplifies the weighted average value of the combined inputs to the cell. The change in the amplification factor as a function of the time elapsed or the number of occurring detection cycles since a change in intensity from light to dark or dark to light has occurred is termed the relaxation factor.

Since the amplification factor, $\sigma$, can rise only in response to changes in intensity, the cells 102 in array 100 will not respond to static patterns in the field under observation, i.e., where no motion is occurring and light spots, for example, remain centered over particular cells in the array.

Assume, for purposes of explanation, that a spot of light moves across a field of observation from left to right at the rate of one cell per detection cycle. Equation (6) is observed in cell operation so that the output from a cell to the right in the array will be equal to the amplifcation factor, $\sigma$, times the value of the input received from the cell to the left thereof.

Table I below shows the consequences of time evolution for the particular spot being detected as it progressed through the field of observation. Table I shows the values of at least SIGMIN for six cells in an array during six time steps or detection cycles through the array. At $t=0$, cell 6 receives a value at least equal to SIGMIN from the cell to the right whereas at $t=1$, cell 5 will receive from the cell to the right a value strength of SIGMIN$\times$AMPMAX. Thus, at time, $t=5$ or $t=n$, the cell detecting the moving spot will receive a value strength of SIGMIN$\times$AMPMAX$^n$, illustrating that motion across the field of observation leads to a large-value.

TABLE I

| Time | Cell # | | | | | |
|---|---|---|---|---|---|---|
| | 1 | 2 | 3 | 4 | 5 | 6 |
| t = 0 | 0 | 0 | 0 | 0 | 0 | 1 |
| t = 1 | 0 | 0 | 0 | 0 | 1 | 0 |
| t = 2 | 0 | 0 | 0 | 1 | 0 | 0 |
| t = 3 | 0 | 0 | 1 | 0 | 0 | 0 |
| t = 4 | 0 | 1 | 0 | 0 | 0 | 0 |
| t = 5 | 1 | 0 | 0 | 0 | 0 | 0 |

The choice of weighted average, length of detection cycle, the relaxation factor for the amplification level, AMPMIN and AMPMAX, and the values for SIGMIN and SIGMAX, determine the behavior of the array. As an example, if detection of motion is to be accomplished at a particular rate, v, a sharply decreasing relaxation factor in order to gain robustness against noise. On the other hand, an array with a slowly decreasing relaxation factor detects a wider range of speeds and, in the absence of noise, could be made to distinguish between different speeds.

The choice of weighted averages determines what kind of motion the array can detect. If, for example, all six inputs, $I_1$-$I_6$, in cell 102 in FIG. 9 are averaged, an array of such cells will be able to detect any prolonged motion, regardless of any changes in direction by such motion. Invoking simpler averaging rules, such as a straight line selection of an opposite incoming input for processing and its output at the opposite side of the cell. i.e. straight line motion in the senary directions through cell 102, the array will detect only straight line motion in the six natural directions through each cell, with amplified values traveling in the same direction as the detected motion. The scheme in FIG. 10 provides for fault tolerant detection for various kinds of motion with the ability to differentiate between them.

Figure 11:
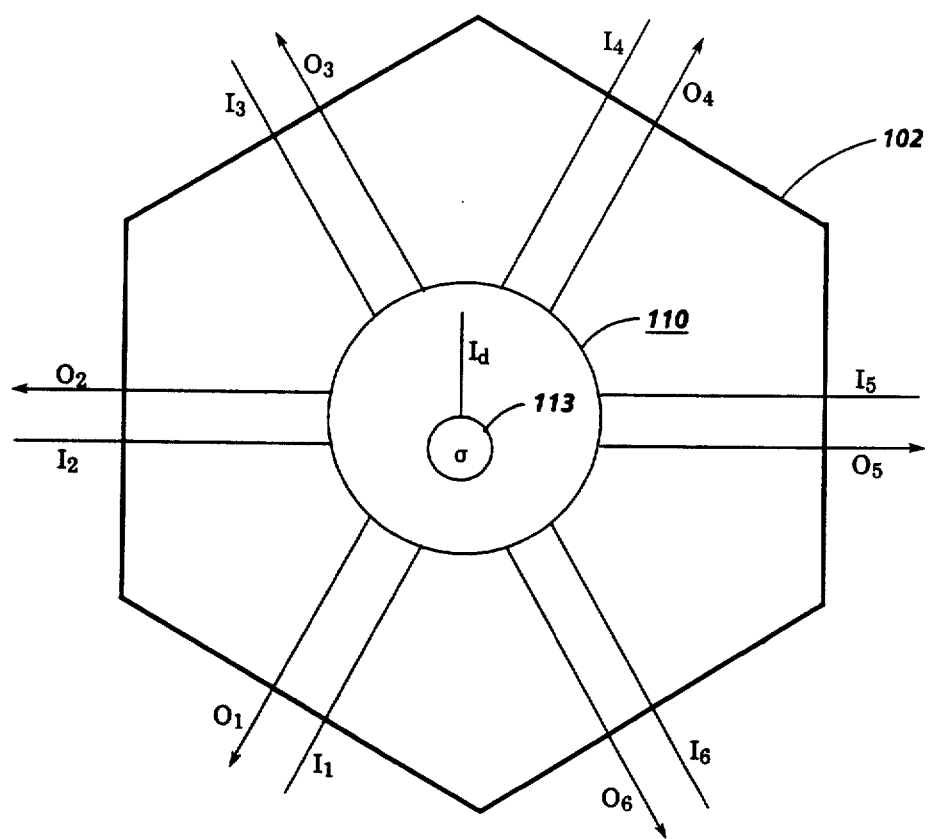
FIG. 11 is a further schematic representation of a coupling arrangement that may be employed for the hexagonal detecting units or cells in a cellular processor array according to this invention.
Figure 15:
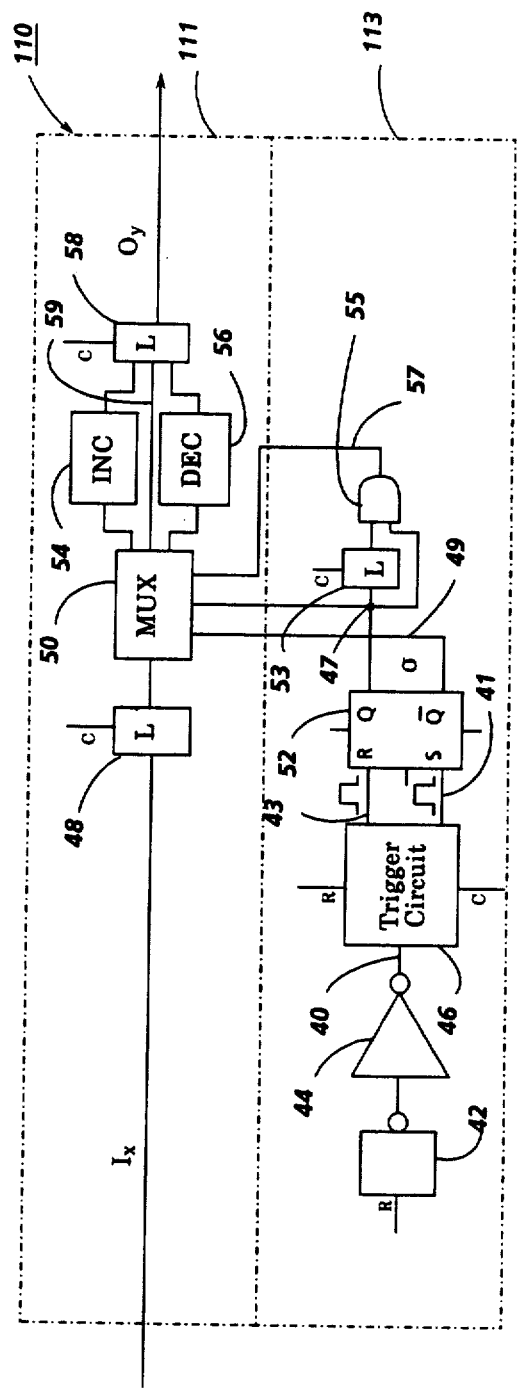
FIG. 15 is a schematic diagram of a circuit for a unit or cell in the cellular processor array of the type represented in FIG. 11.

Reference is now made to FIG. 11 which illustrates a senary input/output cell 102 wherein each of the six inputs, $I_1$-$I_6$, from neighboring cells are respectively processed via detection and processing circuit 110 in FIG. 15 and the resulting data value is provided as an output, $O_y$, diagonally opposite from the input. $I_x$. Circuit 110 is identical to circuit 39 in FIG. 4. except for duplicated lower portion thereof, as there would be five processing portions 111 connected as shown in FIG. 15 to the same amplification determination portion 113. For example, input, $I_1$, is processed via circuit portion 111 and the resulting data value is provided as output, $O_4$. By the same token, input, $I_4$, is provided via a separate or another circuit portion 111 and the resulting data value is provided as output, $O_1$. The same is true for combination input/outputs $I_2/O_5$, $I_5/O_2$, $I_3/O_6$ and $I_6/O_3$ with each combination processed by its own individual circuit portion 111. The detected light input, $I_d$, to detection circuit portion 113 represents the amplification factor, $\sigma$, and, in this case, is, in effect, the same as $S_f$. In the case of FIG. 15, therefore, the amplification factor, $\sigma$, is not a multilevel factor but rather a binary factor. Thus, when $S_f$ equals 1, $\sigma$ equals 1; otherwise, $\sigma$ is equal to 0. Since circuit 110 is essentially the same as circuit 39 in FIG. 4, the description for that figure portion applies to FIG. 15 with identical components carrying the same reference numerals.

Figure 12A:
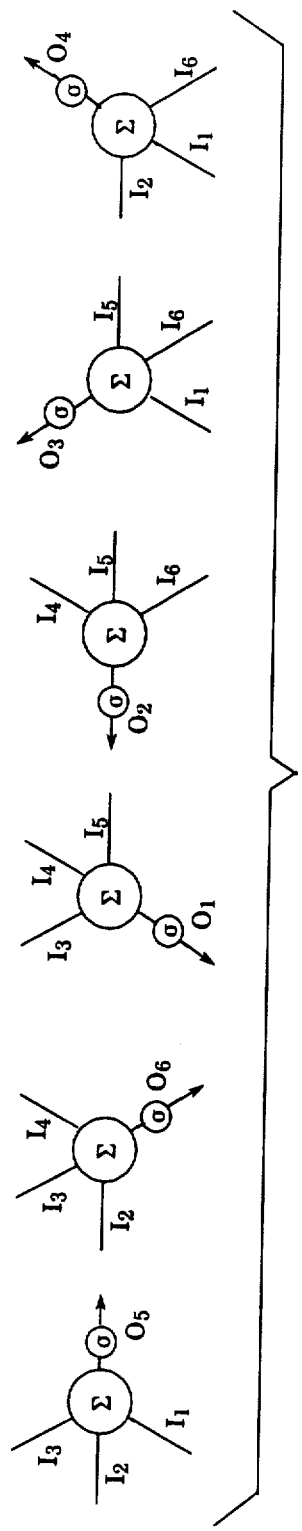
FIGS. 12A and 12B other schematic representations of a coupling arrangement that may be employed for the hexagonal detecting units or cells in a cellular processor array according to this invention.
Figure 12B:
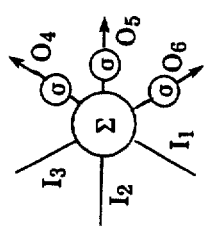

FIGS. 12A and 12B are examples of other possible neighboring cell connections and processing of the inputs/outputs to senary cells making up an array 100. In FIG. 12A, six possible representations for three inputs processed to a single output is shown. However, any combination of inputs/outputs can be chosen. For example, instead of three inputs to a single output, as shown in FIG. 12A, the single output may be supplied to three different neighboring cells, as depicted in FIG. 12B. For this particular representation, there would also be six possible representations for three inputs processed to provide three outputs. Each of the six representations in FIG. 12A would require six separate, identical circuits to process one of six possible three-input combinations to produce a single output by weight averaging the three inputs and applying an amplification factor, $\sigma$, to produce a data value for output to a neighboring cell. Circuit 120 in FIG. 16 may be utilized to accomplish this processing. Circuit portion 123 is essentially the same as that portion of circuit 39 in FIG. 4 relating to light detection and therefore identical components have the same reference numerals. However, processing circuit portion 121 is different to accommodate for weight averaging and amplification factor determination.

Figure 16:
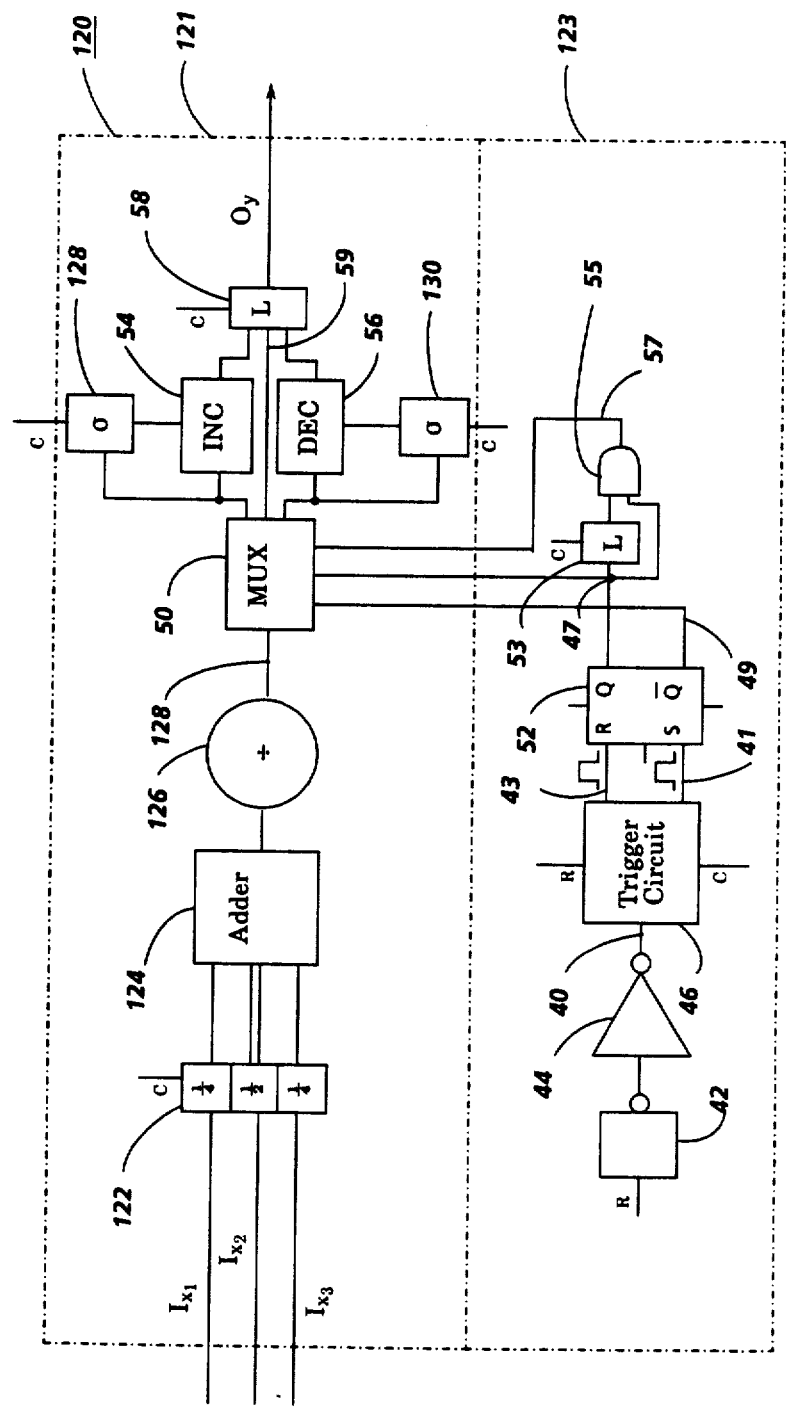
FIG. 16 is a schematic diagram of a circuit for a unit or cell in the cellular processor array of the type represented in FIG. 12A.

In FIG. 16, three inputs are supplied to latch 122 of processing circuit 121 which, in combination with adder 124, provides desired weighting to the data values on respective lines $I_{x1}$, $I_{x2}$ and $I_{x3}$. The weight shown is respectively $\frac{1}{4}$, $\frac{1}{2}$ and $\frac{1}{4}$. The weighting is accomplished digitally in a conventional manner by adding in a 4-bit adder 124 the binary data value for $I_{x1}$ once, the binary data value $I_{x2}$ twice and the binary data value $I_{x3}$ once. The added value may then be averaged by dividing, as indicated at 126, by the number of weightings, which is four ($I_{x1}+2I_{x2}+I_{x3}$). This is accomplished by dropping the two least significant bits in adder 124. The averaging may not be required in certain embodiments, particularly if the range of SIGMIN and SIGMAX is not large.

The weighted average on line 128 is fed to MUX 50, where, depending upon whether the light detection circuit portion 123 has detected a change in intensity from dark to light ("0" to "1") or light to dark ("1" to "0"), the data value will be respectively increased by incrementor 54 or decreased by decrementor 55 or unaffected via line 59. In the case of light intensity change to "1" or "0", the amplification factor, $\sigma$, on the next detection cycle will be respectively increased or decreased via multiplier 128 or 130 so that the incremental increase or decremented decrease will be respectively altered to be a larger or smaller factor on the weight averaged data value as supplied as output $O_y$ via latch 58.

Figure 13:
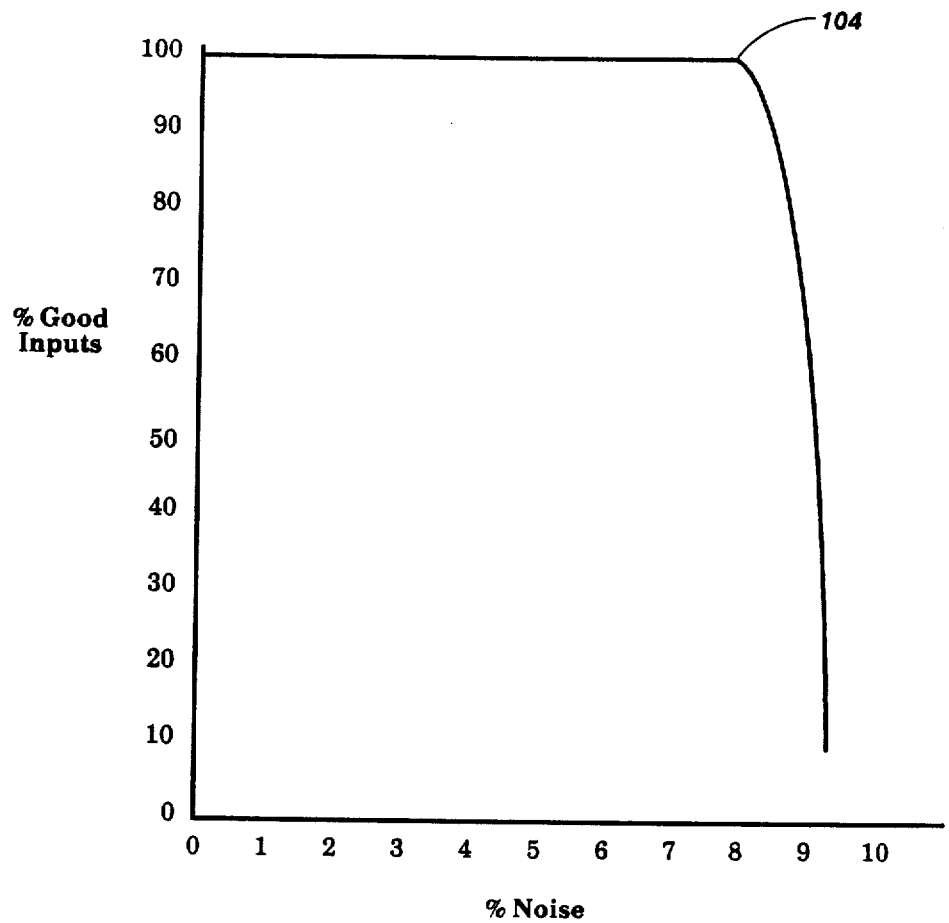
FIG. 13 is a graphic illustration of the percentage of good inputs versus percentage of noise for a 234 cell array having cells of the type illustrated in FIG. 9.

FIG. 13 is a graphic representation of the percent of outputs indicative of moving spot versus the percent noise for simulation of a senary cell array 100 made up of 234 cells of the type illustrated in FIG. 9 and connected for detection of straight line motion in the six natural directions through each cell 102. motion was accurately detected in spite of the existence of a fluctuating background. To be noted from the results in FIG. 13 that beyond a noise level of 8% at 104, the array 100 started to produce outputs corresponding to spurious motion. Thus, up to this point the array responds with a highly efficient fault tolerant capability. To understand this fault tolerance, one can think of each output value strength as the strength of the hypothesis that motion is occurring. When an individual cell 102 detects a change in light intensity, it is detecting, in essence, the possibility of motion and broadcasts its hypothesis in the form of an amplified output, O. At the next detection cycle, each neighboring cell connected to receive this output either corroborates the hypothesis by reamplifying this value or indicates its lack of supporting evidence by attenuating the signal. The collective nature of this kind of computation, detailed previously, ensures that no single cell 102 can unduly influence the final outcome of motion detection. Thus, as indicated in the results of FIG. 13, noise in view under observation will have to be widespread before it can interfere with accurate motion detection.

Figure 14:
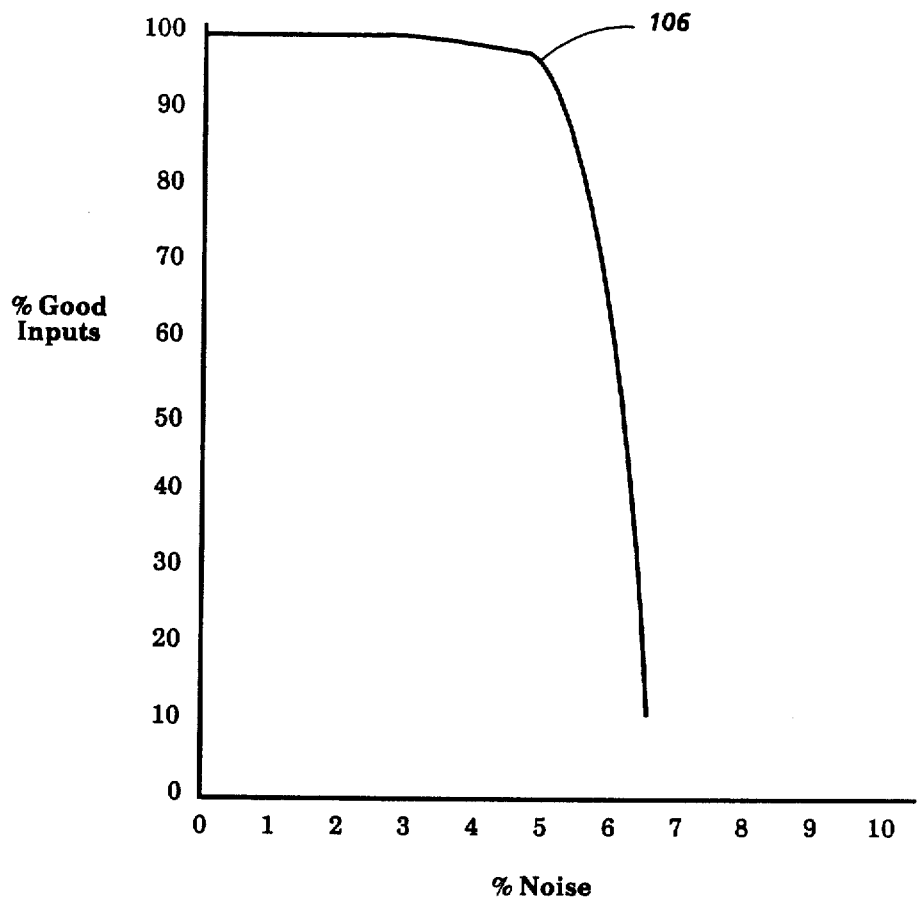
FIG. 14 is a graphic illustration of the percentage of good inputs versus percentage of noise for a 234 cell array having cells of the type illustrated in FIG. 10.

FIG. 14 is a graphic representation of the percent of outputs indicative of moving spot versus the percent noise for simulation of an array 100 having 234 cells 102 of the type disclosed in FIG. 10 with the weighted averages as shown in that figure and following the same kind of rules of computation. This provides for straight line detection in any direction. As can be determined from FIG. 14, the array with this cell arrangement is not as robust, i.e., it does not have as high degree of sensitivity against noise as the results for the array illustrated in FIG. 13 because beyond a noise level of about 5.5%, vis a vis 8%, the array starts to produce outputs corresponding to spurious motion. Thus, the price for increase sensitivity relative direction and speed of motion is a reduction in robustness. An increase in robustness, however, can be accomplished by employing two arrays in tandem or parallel. The first array would examine the field of observation to detect motion while the second array woudl have its inputs, $I_d$, also connected to the outputs of corresponding cells in the first array to receive the output values and process them for determining motion through the field of observation. Thus, there would be not light detection inputs for the cells in the second array. These inputs from the first array would categorized as follows: If the output fromm a cell in the first array equals SIGMAX, then the corresponding cell in the second array would provide an output its connected neighboring cells indicative of a change in intensity an, thus, amplification factor, e.g. 0 to 1. Because sustained motion detected as a moving pattern of high outputs along cell paths in the first array and noise in the form of random occurring spots creates only momentary patterns of high outpus, the first array functions as a filter for removing most of the noise while the coupled second array accurately follows the travel and direction of motion of the pattern as monitored from the outputs of the first array without significant noise interference. In this manner, both arrays may be less robust but more sensitive to speed and direction.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A method of detecting motion in the presence of noise comprising the steps of
providing a plurality of photodetector processing cells in an array with each cell capable of detecting intensity change in a field under observation, connecting one or more outputs of each processing cell as one or more inputs to one or more neighboring processing cells, each input indicative of whether or not a neighboring cell has detected an intensity change, processing inputs received from a neighboring cell by incrementing an input if the receiving cell has detected an intensity change from dark to light in consecutive detection cycles and decrementing an input if the receiving cell has detected an intensity change from light to dark in consecutive detection cycles, and, otherwise, imposing no change on the input if there is not intensity change in consecutive detection cycles, and providing the processed input as an output to a neighboring processing cell.

2. The method of detecting motion in the presence of noise of claim 1 including the step of incrementing the input by a unit value if the receiving cell has detected an intensity change from dark to light in consecutive detection cycles and decrementing an input by a unit value if the receiving cell has detected either no light in consecutive detection cycles or an intensity change from light to dark in consecutive detection cycles and, otherwise, imposing no change on the input if light is detected in consecutive detection cycles.

3. The method of detecting motion in the presence of noise of claim 1 including the step of incrementing the input by an amplification factor if the receiving cell has detected an intensity change from dark to light in consecutive detection cycles and decrementing an input by an amplification factor of the receiving cell has detected an intensity change from light to dark in consecutive detection cycles and, otherwise, imposing no change on the input if there is no intensity change detected in consecutive detection cycles.

4. A cellular processing array comprising a plurality of processing cells wherein each cell is capable of detecting intensity change in a field under observation, said processing cells each having one or more outputs connected as inputs to one or more neighboring processing cells, each of said inputs indicative of whether or not its connected neighboring processing cell has detected an intensity change, each said processing cell having means to increment said inputs if a cell receiving said inputs has detected an intensity change from dark to light in consecutive detection cycles and to decrement said inputs if said receiving cell has detected an intensity change from light to dark in consecutive detection cycles, said inputs as processed provided as an output to connected neighboring processing cells.

5. The cellular processing array of claim 4 wherein said means to increment and to decrement said inputs is nonoperative if said receiving cell has detected light in consecutive detection cycles, said inputs being provided as is to said connected neighboring cells.

6. The cellular processing array of claim 4 wherein said means to increment and to decrement said inputs is nonoperative if no intensity change has occurred in consecutive detection cycles, said inputs being provided as is to said connected neighboring cells.

7. The cellular processing array of claim 4 wherein said means to increment and to decrement said inputs is incremented and decremented as a unit value.

8. The cellular processing array of claim 4 wherein said means to increment and to decrement said inputs is incremented and decremented by an amplification factor.

* * * * *